United States Patent [19]

Parsons et al.

[11] Patent Number: 4,670,897

[45] Date of Patent: * Jun. 2, 1987

[54] CIRCUIT TESTING OF TELEPHONE GRIDS OR THE LIKE

[75] Inventors: Donald F. Parsons; Gerald J. Parsons; Brian D. Greenwald, all of West Chester, Pa.; Elizabeth A. Forsythe, Covina, Calif.

[73] Assignee: Communications Test Design, Inc., West Chester, Pa.

[ * ] Notice: The portion of the term of this patent subsequent to Sep. 10, 2002 has been disclaimed.

[21] Appl. No.: 774,061

[22] Filed: Sep. 9, 1985

Related U.S. Application Data

[63] Continuation-in-part of Ser. No. 520,194, Aug. 4, 1983, Pat. No. 4,540,857, which is a continuation-in-part of Ser. No. 341,708, Jan. 22, 1982, abandoned.

[51] Int. Cl.[4] .............................................. H04M 3/28
[52] U.S. Cl. ........................................ 379/10; 379/16; 379/17
[58] Field of Search ................... 179/175.21, 175.2 R, 179/175.2 C, 175.25, 175.2 D; 371/20, 15

[56] References Cited

FOREIGN PATENT DOCUMENTS 53-98709 8/1978 Japan ............................... 179/175.21

Primary Examiner—Stafford D. Schreyer
Attorney, Agent, or Firm—Connolly and Hutz

[57] ABSTRACT

Multiple electrical path assembly as in a telephone grid, is rapidly and accurately checked by grounding one end of all but one of the path conductors, applying a test signal to that one end, detecting the presence or absence of signal on both ends of all conductors, and repeating the procedure for all the conductors, as with a computer containing a microprocessor. Where the conductors are individually switched, they can all be switched on beforehand. Detectors can also be connected to the conductors during the testing, to detect unusually high voltages, and testing can be interrupted when such voltages are detected. Switch actuation can be separately tested by detecting the passage of current that is used to actuate them.

2 Claims, 11 Drawing Figures

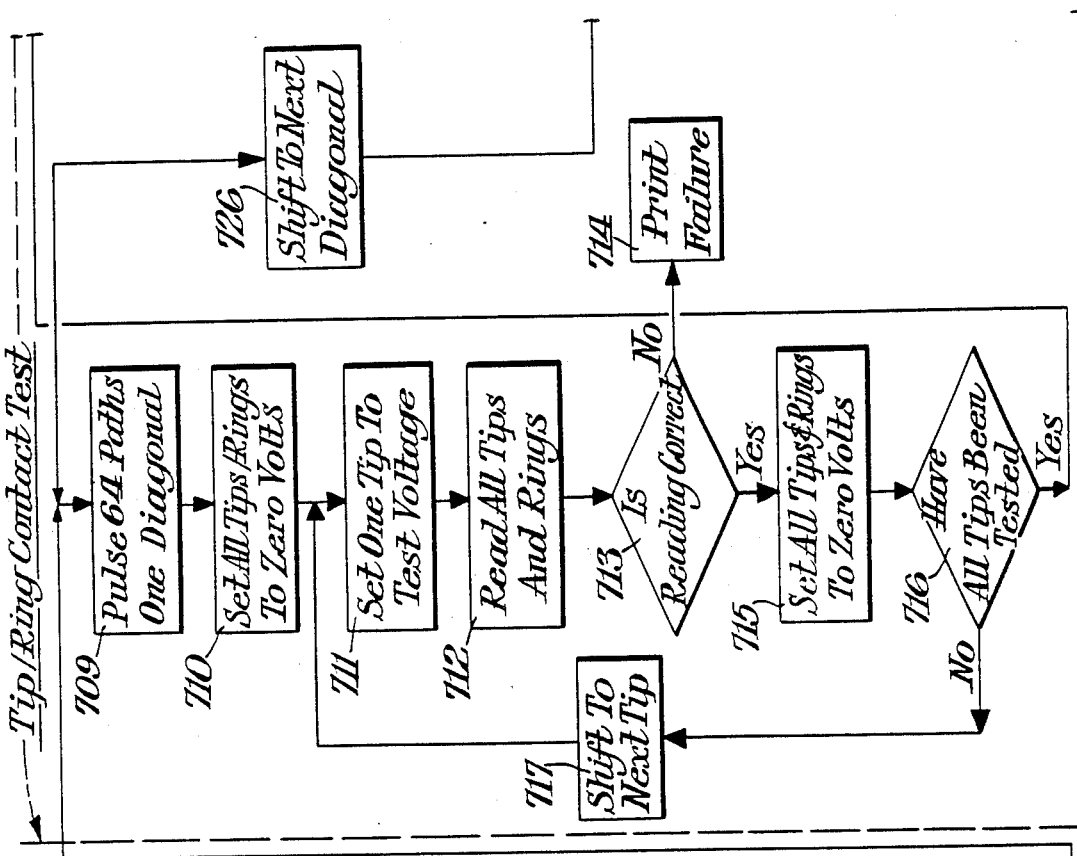
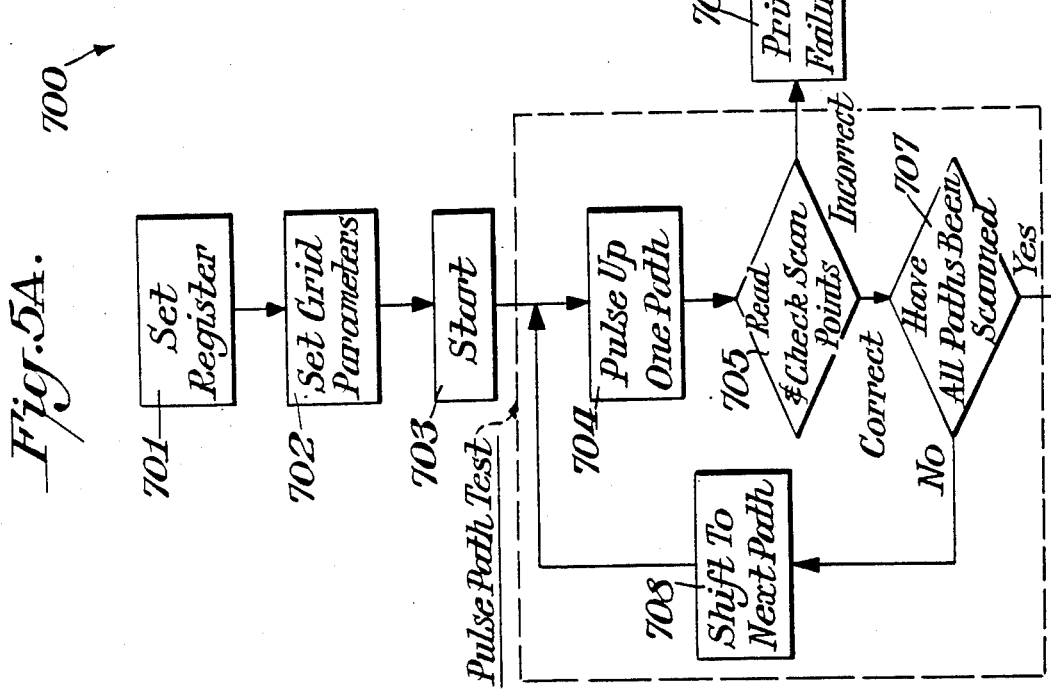
Fig. 5A.

High Voltage Detecting Board

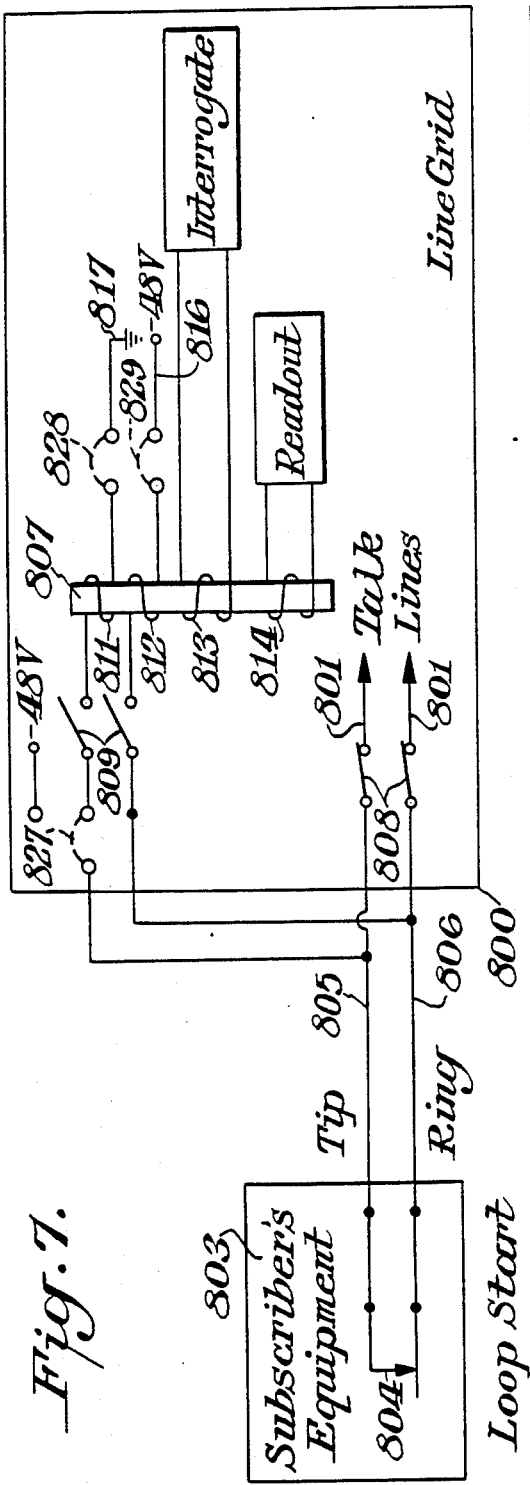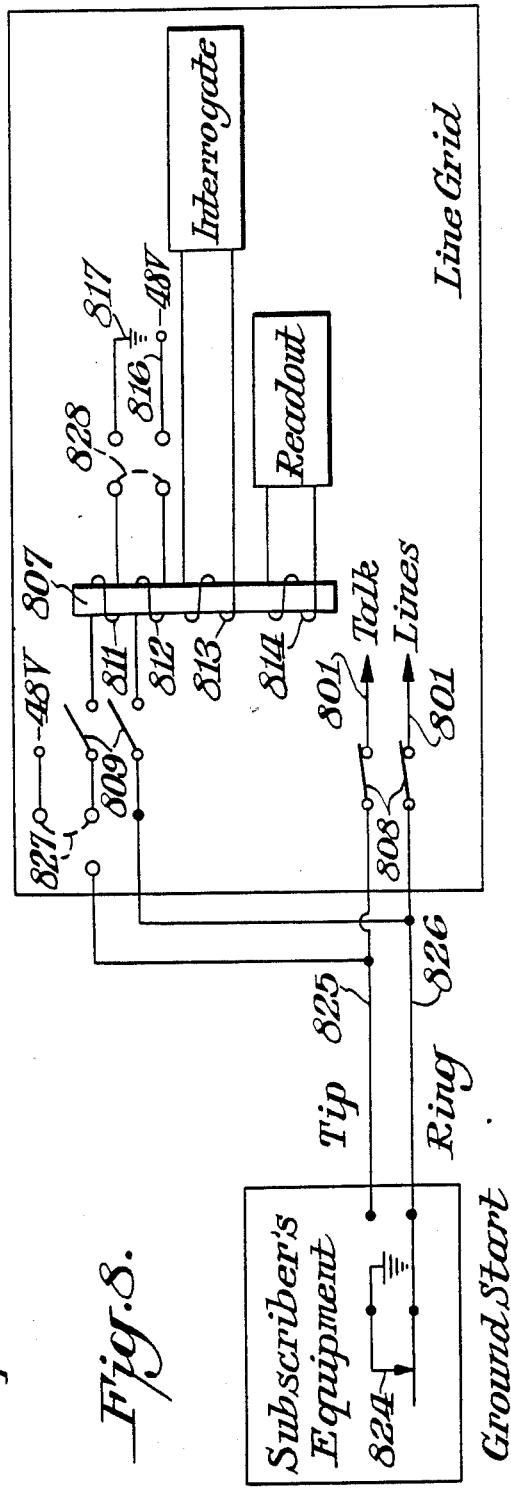

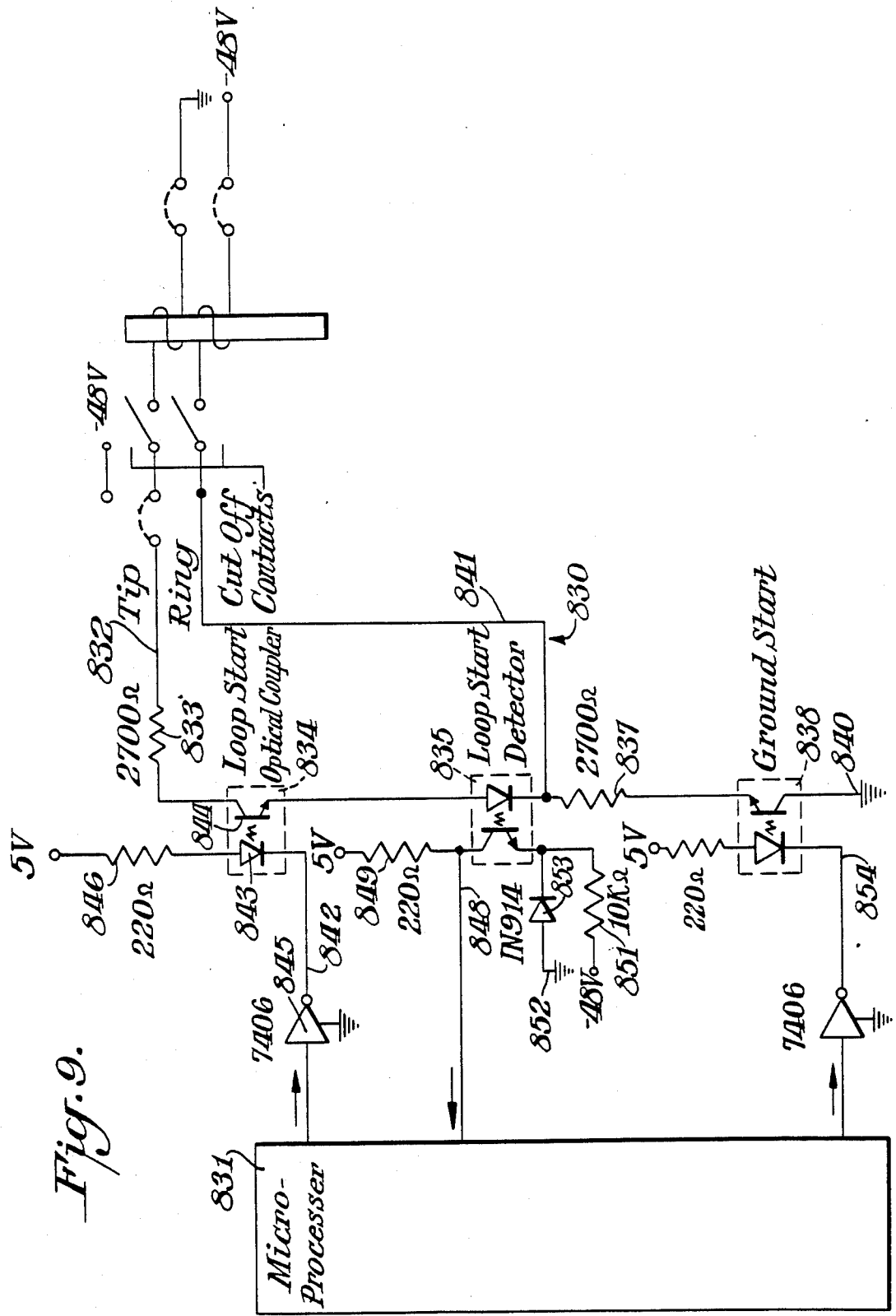

CIRCUIT TESTING OF TELEPHONE GRIDS OR THE LIKE

The present application is a continuation-in-part of application Ser. No. 520,194 filed Aug. 4, 1983 (U.S. Pat. No. 4,540,857 granted Sept. 10, 1985), which in turn is a continuation-in-part of application Ser. No. 341,708 filed Jan. 22, 1982 and subsequently abandoned.

The subject mater of the present application has no connection with government sponsored research.

BACKGROUND AND OBJECTS

The present invention relates to the testing of electric circuits, more particularly to telephone circuits.

While the testing of telephone circuits has been described in the past, as shown for example in Japanese application publication No. 53-98709 published Aug. 29, 1978, the prior testing of complex circuits such as telephone grids has not been as effective as desired.

Among the objects of the present invention is the provision of novel apparatus and techniques for testing delicate circuits.

Additional objects of the present invention include the testing of complex telephone switching circuits with a high order of accuracy.

The foregoing as well as still further objects of the present invention will be more fully understood from the following description of several of its exemplifications, reference being made to the accompanying drawings, wherein:

BRIEF DESCRIPTION OF DRAWINGS

FIGS. 7 and 8 are diagrammatic views of telephone line grid circuits;

FIG. 9 is a circuit diagram showing key portions of a telephone line grid identifying circuit.

SUMMARY

The present invention effectively tests a telephone switching grid having a multiplicity of incoming telephone subscriber trunk lines, a multiplicity of outgoing telephone subscriber trunk lines, and switch selector means connected to establish individual connections between individual incoming lines and individual outgoing lines. This testing is rapidly accomplished by momentarily establishing all the individual interconnections in rapid sequence, during each such interconnection, or after a set of them has been established, applying a signal to the interconnected incoming connectors, grounding one end of all but one of the connectors, applying a signal to that one end, and detecting the presence or absence of signal on both ends of all connectors. These steps can then be repeated on the successive connectors. The presence or absence of an excessive voltage can simultaneously be detected and can be used to interrupt the testing.

It is preferred that the applied signal be at a voltage lower than the maximum voltage of the signals normally passing between input and output connectors when the switching grid is in its normal use. This helps to better detect poor switch closings that leave a significant resistance in the communication path.

If desired, the switch actuation can be separately tested by momentarily triggering the switching of the individual interconnections in sequence, and detecting the presence or absence of each switch triggering.

The apparatus for the foregoing tests preferably contains a pair of excessive voltage detectors, one connected for detecting excessive voltage on the incoming lines, and the other for detecting excessive voltage on the outgoing lines.

It is also helpful for the excessive voltage detectors to provide a computer-controlling output electrically isolated from the remainder of the detectors and from any other connection to the testing circuits and to the circuits being tested.

DESCRIPTION OF PREFERRED EMBODIMENTS

Figure 1:
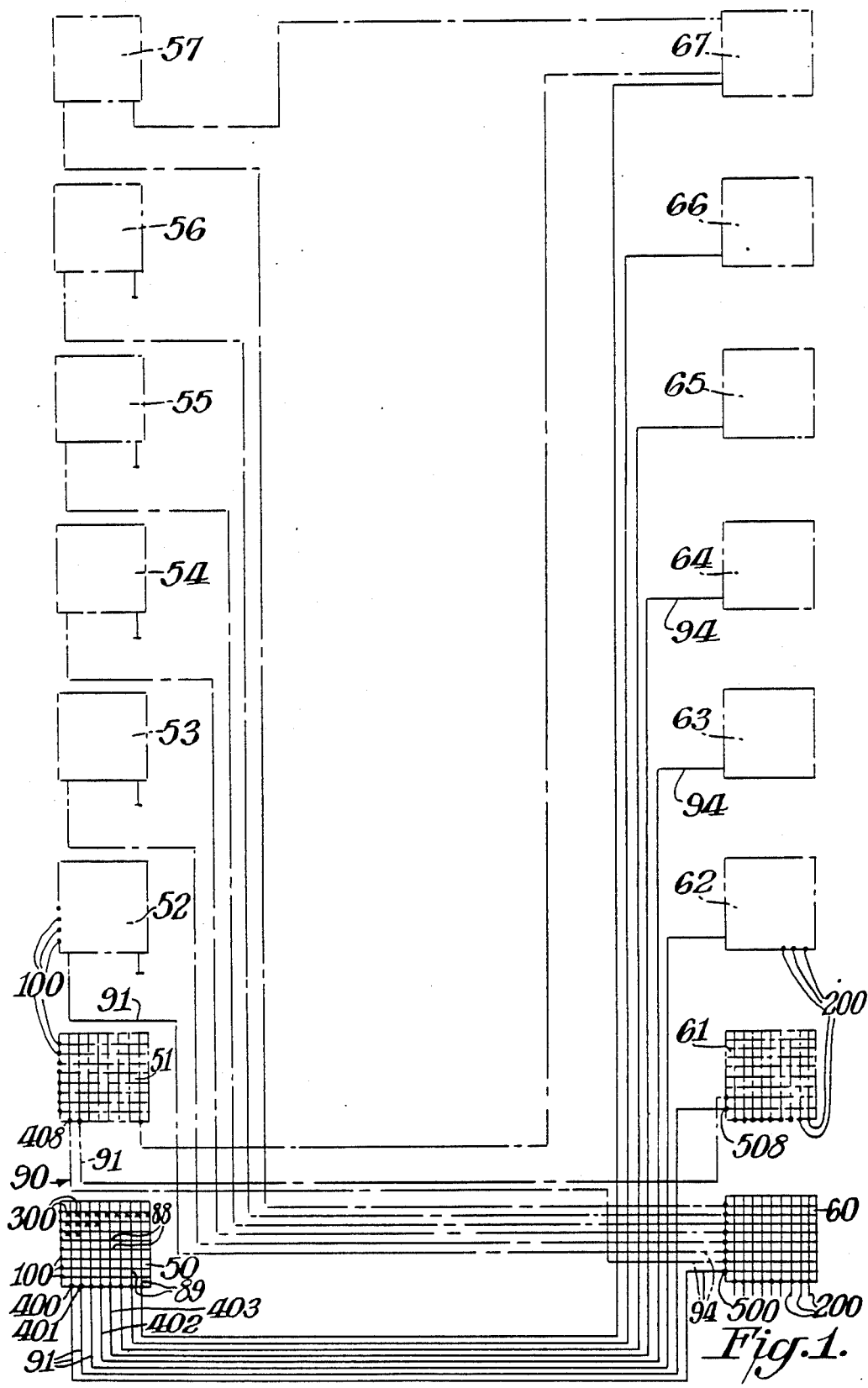
FIG. 1 is a schematic illustration of a switchable grid communication circuit of the type suitable for testing in accordance with the present invention.

Turning now to the drawings, FIG. 1 schematically illustrates a telephone communication grid 90 having 64 incoming lines 100, 64 outgoing lines 200, and a switching arrangement 300 for connecting the individual incoming lines to individually selectable outgoing lines. This grid can be used in a telephone central office for routing telephone calls from one trunk to another, or from subscribers to trunks, or from subscribers to subscribers, or from trunks to subscribers. Each line in FIG. 1 represents a pair of tip and ring conductors that make a single telephone circuit.

The incoming lines 100 are divided into eight groups of eight lines each, each group being connected to a different 8 by 8 switch matrix 50, 51, 52, 53, 54, 55, 56 and 57. Such matrix has a set of eight conductors 88 extending across the matrix in one direction, and another set of eight conductors 89 crossing but insulated from the first set. At one end, each conductor 88 is connected to a different incoming line 100, and the crossing conductors 89 are similarly connected to grid links 91. At each crossing between conductors 88 and 89, selector switches 300 interconnect the crossed conductors so as to make or break the electrical continuity between them. There are accordingly 64 switches 300 in each matrix.

Links 91 are connected at 94 to a second array of eight 8 by 8 switching matrixes 60, 61, 62, 63, 64, 65, 66 and 67, and 64 outgoing telephone lines 200 are also connected to that second array. These link connections are so arranged that each matrix in the first or input array is linked to all eight matrixes of the second or output array. Thus terminal 400 of matrix 50 is linked to terminal 500 of matrix 60, terminal 401 of matrix 50 is linked to terminal 508 of matrix 61, and the remaining terminals 402, 403 etc of matrix 50 linked respectively to terminals on matrixes 62 through 67. A similar linkage distribution also links the terminals 408 etc. of matrix 51 to the respective matrixes 60 through 67.

Each of the switches 300 in both matrix arrays is electrically operated by similar arrays of actuating conductor matrixes that are electrically isolated from the conductors of FIG. 1. However the switch-actuating circuits for the input switches can be tied to those for the output switches so that only one selection, of an input connector 100 and an output connector 200 for example, will actuate a pair of switches to complete a communication path.

The switches are electrically actuated by a control circuit and any control circuit can be used. Thus the switches can be transistors or they can be relay controlled or can have contacts brought together by a strong magnetic field of momentary duration, and separated by a differently oriented magnetic field. Such fields can then be generated by electrical pulses suitably timed. Each switch can be of the stepping type so that one momentary actuation will shift it from on to off (or from off to on), and its next actuation will shift it back. If desired however the switches can be arranged so that upon actuation they switch from off to on (or vice versa), and when the actuation is terminated the switches return to their original conditions.

The many connections and many switches of a telephone communication grid make it likely to fail in a host of different ways. Switch contacts and switching action can deteriorate, and open, short, and crossed circuits develop. The entire grid or large portions of it can be ruined by unusual voltages that appear on the wrong conductors. Such a large potential appearing in a communication line, e.g. because of a crossed circuit between the switch-selector network and the tip-ring network, can seriously damage electronic equipment to which the grid connects.

Because of the complexity of a grid, hand testing is too slow and inaccurate, and even automatic testing has heretofore not provided the desired accuracy and reliability.

Pursuant to the present invention testing is effected automaticaly and with a very high order of accuracy.

Figure 2:
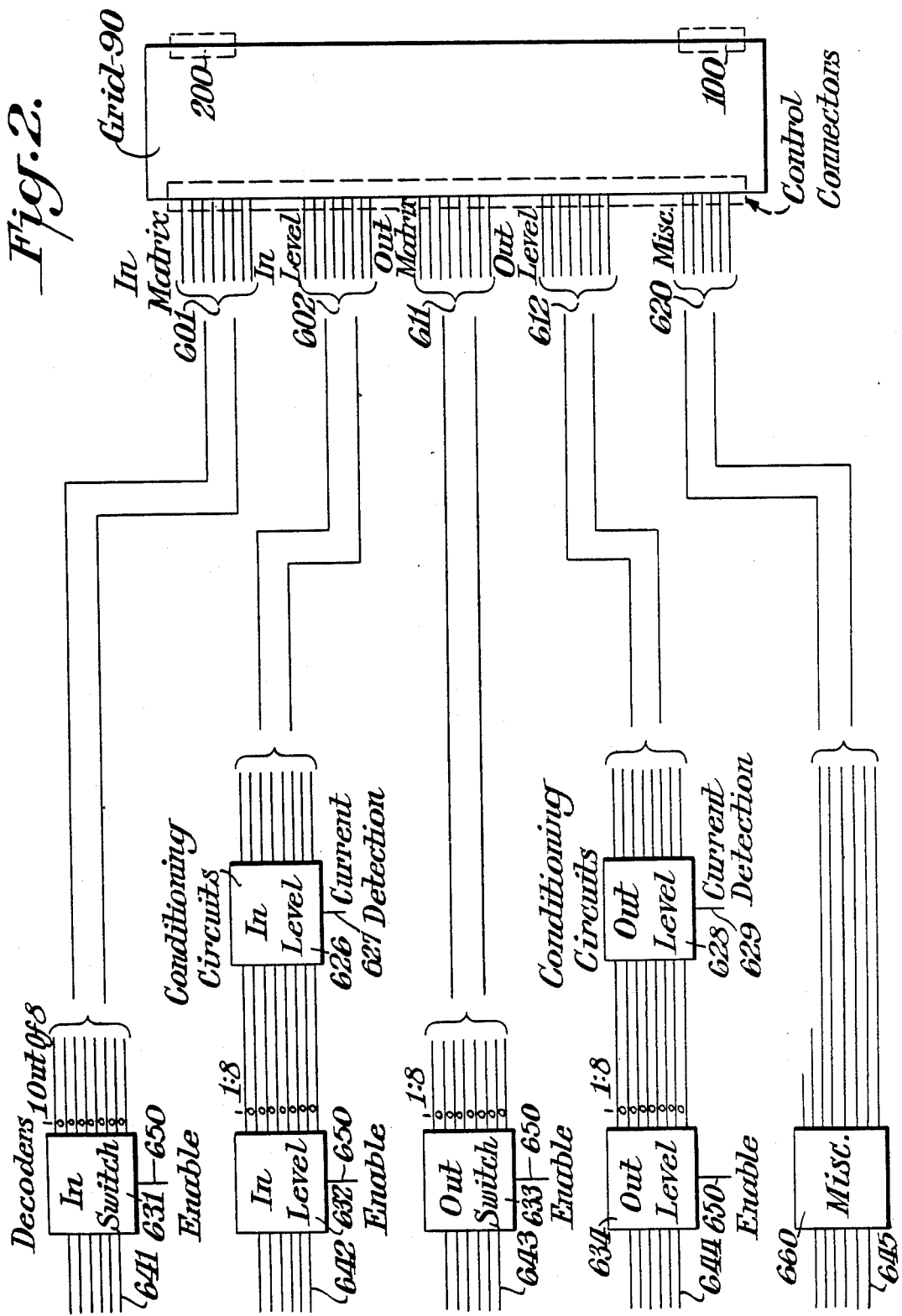
FIG. 2 is a schematic illustration of a switchactuating circuit for the communication circuit of FIG. 1.

FIG. 2 schematically shows a switch-actuating arrangement for the matrix switches. Here grid 90 is provided with a group of eight leads 601 each connected to the respective input switch matrixes, and another group of leads 602 each connected to a separate switch input line corresponding to the horizontal rows or input levels of the tip-ring conductors in the input matrixes.

Another set of eight leads 611 is similarly connected to the eight individual output switch matrixes, with a fourth set of eight leads 612 to the eight individual vertical output levels of the output switches.

Grid 90 also has an additional group of leads 620, shown as six in number, for separate use such as to return information to the test unit, and/or to actuate special monitoring switches that may be present in certain grids.

The input and output grid connectors 100 and 200 of FIG. 1, are not fully illustrated in FIG. 2.

Leads 601 are connected to the output of decoder 631, which decoder has a six-bit input 641 and an enable lead 650.

Leads 602 are similarly connected to a similar decoder 632 through a driver 626 that has an output lead 627 supplying current information to the test unit. Leads 601 and 602 select the input matrix and input switch levels. At the same time lead 627 shows the passage of the switch-actuating current when that takes place.

A correspondingly connected additional pair of decoders 633, 634 actuated from six-bit inputs 643, 644, with a driver 628 providing a current signal to detector lead 629, selects the output matrixes and output switch levels of grid 90.

Decoder enable leads 650 are connected together for simultaneous actuation through a miscellaneous microprocessor control 660 which also triggers switch-actuating pulses and in addition provides a read circuit from the current detector leads 627, 629. Switch-actuating pulses of about 4 amperes and about 120 volts, with a duration of about 1 millisecond, are very effective and are readily generated with a pulser controlled by a timing generator. These pulses are supplied to the drivers 626, 628 for delivery to the selected grid input switches.

A single enable actuation can cause a switch-closing pulse to simultaneously pulse up to two grid switches- viz:

(1) an input switch in the input matrix selected by bits 641 and at the input level selected by bits 642, and
(2) an output switch in the output matrix selected by bits 643 and at the output level selected by bits 644.

A set of switch-actuating connector links duplicating the communication links 91, can in such arrangement complete the switch-actuating selection circuits. However other switchselection arrangements can be used to determine which switches are actuated and whether they are actuated simultaneously or sequentially.

Figure 3:
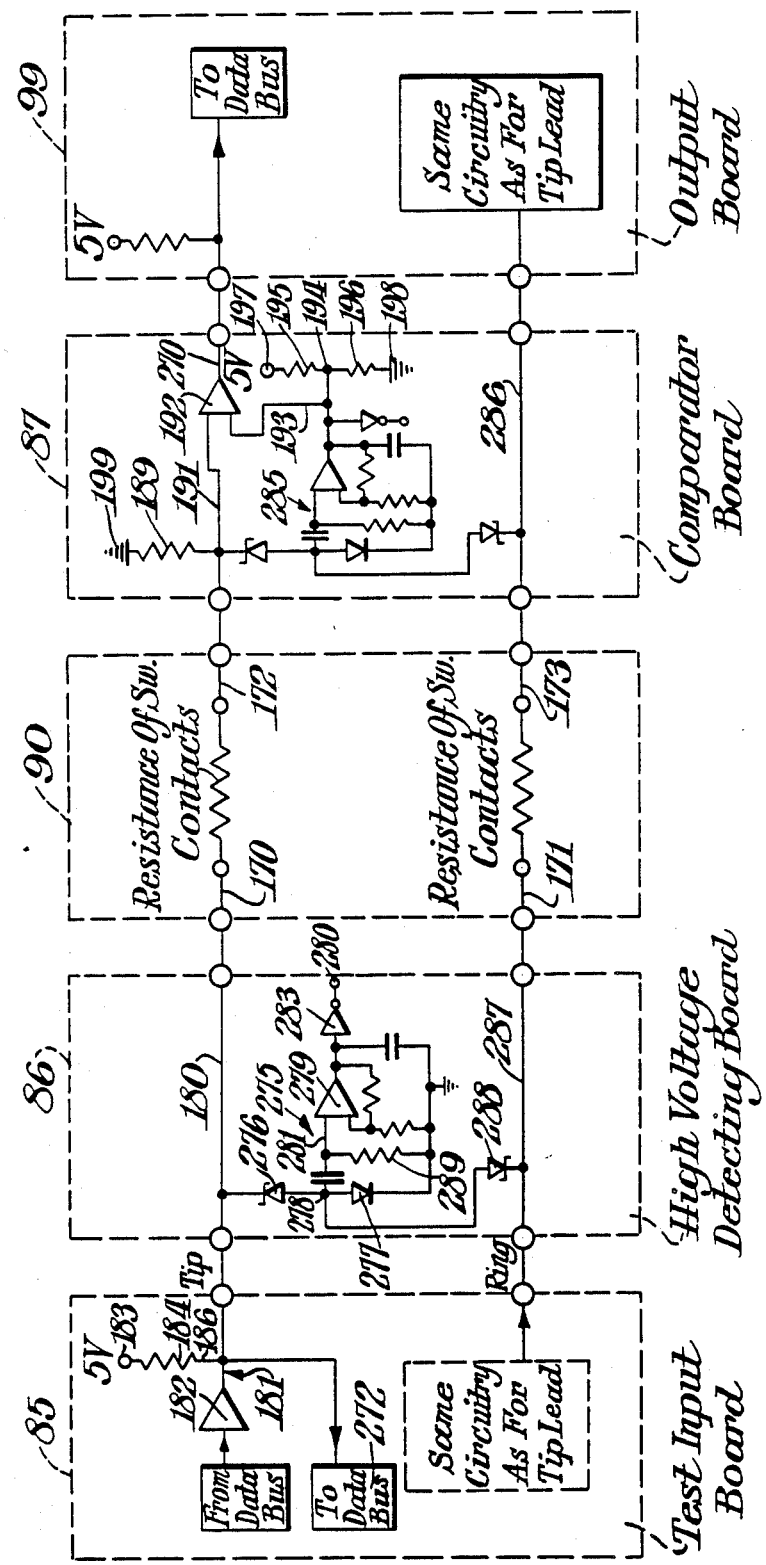
FIG. 3 is a schematic illustration of test connections typical of the present invention.

FIG. 3 shows a typical testing network of the present invention. This network is for a single tip-ring pair in grid 90, the pair having inputs 170, 171, and outputs 172, 173.

To input 170 there is connected a line 180 fed by the output 181 of a buffer gate 182, and by a DC source 183 having an output line 186 in parallel with the gate output 181. A resistor 184 in the DC output line connected to source 183 applies a DC potential to line 180. Output 181 of buffer 182 will drop to DC ground when gate 182 is turned to its ON state, and will be about 3 to 5 volts about ground when buffer 182 is in its OFF state. These signal supply elements are shown mounted on a test input board 85.

Tip output lead 172 connects to the plus input 191 of a comparator 192, the negative input 193 of which is connected to a tap 194 in a voltage-divider notwork 195, 196 across a DC supply 197 grounded as at 198. Plus lead 191 is also returned to DC ground 199 through resistor 189. The comparator determines whether the DC voltage at comparator input 191 is as large as that at input 193, and also whether an output signal applied by buffer gate 182 is at a sufficient magnitude at comparator input 191. The comparator circuit is on a comparator board 87. The output line 270 of comparator 192 reflects the condition of comparator input 191 with respect to comparator input 193. Output 270 connects to an output board 99 containing a sampling unit which communicates with a computer memory.

The network of FIG. 3 also includes a measuring circuit 272 which verifies the presence on output line 181 of the signal delivered through gate 182. Circuit 272 is shown on the input board 85 and can also verify the DC voltage applied to that line because of the DC circuit from source 183 through resistor 184, lines 181, 180, 170 and 172, and resistor 189.

FIG. 3 further includes a high voltage detecting circuit 275 which responds to high DC or AC potentials and interrupts a testing sequence when such a potential appears. A zener diode 276 has its cathode connected to line 180, with its anode returning to DC ground through diode 277. Bridged across diode 277 is an amplifier 279 which takes a small voltage pulse at its input 281, and delivers the amplified pulse into a TTL (transistor-transistor logic) gate 283 whose output 280 communicates with the computer.

Another zener diode 288 has its cathode connected to ring conductor 287, and its anode to the anode of zener diode 276, so that high potentials are detected in the ring lines as well. Ring conductor 287 connects to grid ring conductor 171. The entire high voltage detecting circuit is on a board 86.

A second high voltage detecting circuit 285 is shown as connected to the grid output leads 172, 173, to detect high voltages that may appear in those locations. Connection to grid ring output lead 173 is through ring conductor 286, which also serves a a return connection to output board 99. This second high voltage detector is shown on board 87.

The test signals from buffer gate 182 can merely be a positive-going pulse having an amplitude of about 3 volts and a duration of several milliseconds. The appearance of such a pulse at conductor 270 is determined by the microprocessor which can accordingly write a one, or satisfactory condition, into a memory. The absence of such a pulse at 270, or the presence of such pulse of an amplitude of about 2.5 volts or less, can be written as a zero, or unsatisfactory condition. While this is happening all other tip and ring communication inputs for the grid are grounded as by duplicate circuits 181, 182, 183, and 184, and their voltages are also recorded.

Scanning of the memories by a microprocessor, with the transfer of these memory signals to a teletypewriter, will make that typewriter write a report on the condition of circuits 170–172 and 171–173 of the grid 90, as well as on the existence of a signal elsewhere.

During the foregoing sequence the output ends of all tips and rings have separate resistors 189 returning them to ground.

The appearance of a high potential at 280 or at the corresponding output of detector 285, can be arranged to immediately cause the teletypewriter to write out such a report and to also immediately stop further testing in the event that testing is proceeding automatically.

For detecting unusual negative voltages on the tip and ring conductors, a further detection circuit such as 275 can be connected to either or both the tip and ring conductors, but with its diodes of reversed polarity as compared to diodes 276, 277. A still further negative voltage detector can be used, so that detection of negative voltages can be simultaneously effected at the input and output lines of the grid. In practice however, the detection of unusual voltages need only be for voltages having the same polarity as the voltages used to actuate the grid circuit switches.

A plurality of separate test circuits can be provided inasmuch as the presence of duplicates makes it simpler to shift the testing from one set of grid leads to another. Thus the input board 85 of FIG. 3 can contain 8 or 16 or 32 or 64 sets of buffer gates 182, DC sources 183 and resistors 184, so that several or all of them can be physically connected simultaneously to different input grid leads, and can be individually actuated electronically in groups or in any desired sequence to do the actual testing. A corresponding multiplicity of circuits on boards 86, 87 and 99 can then also be used.

Alternatively a multiplicity of input boards 85 can be used, each board having one test circuit, with boards 86, 87 and 99 correspondingly duplicated or with correspondingly duplicated circuits.

Figure 4:
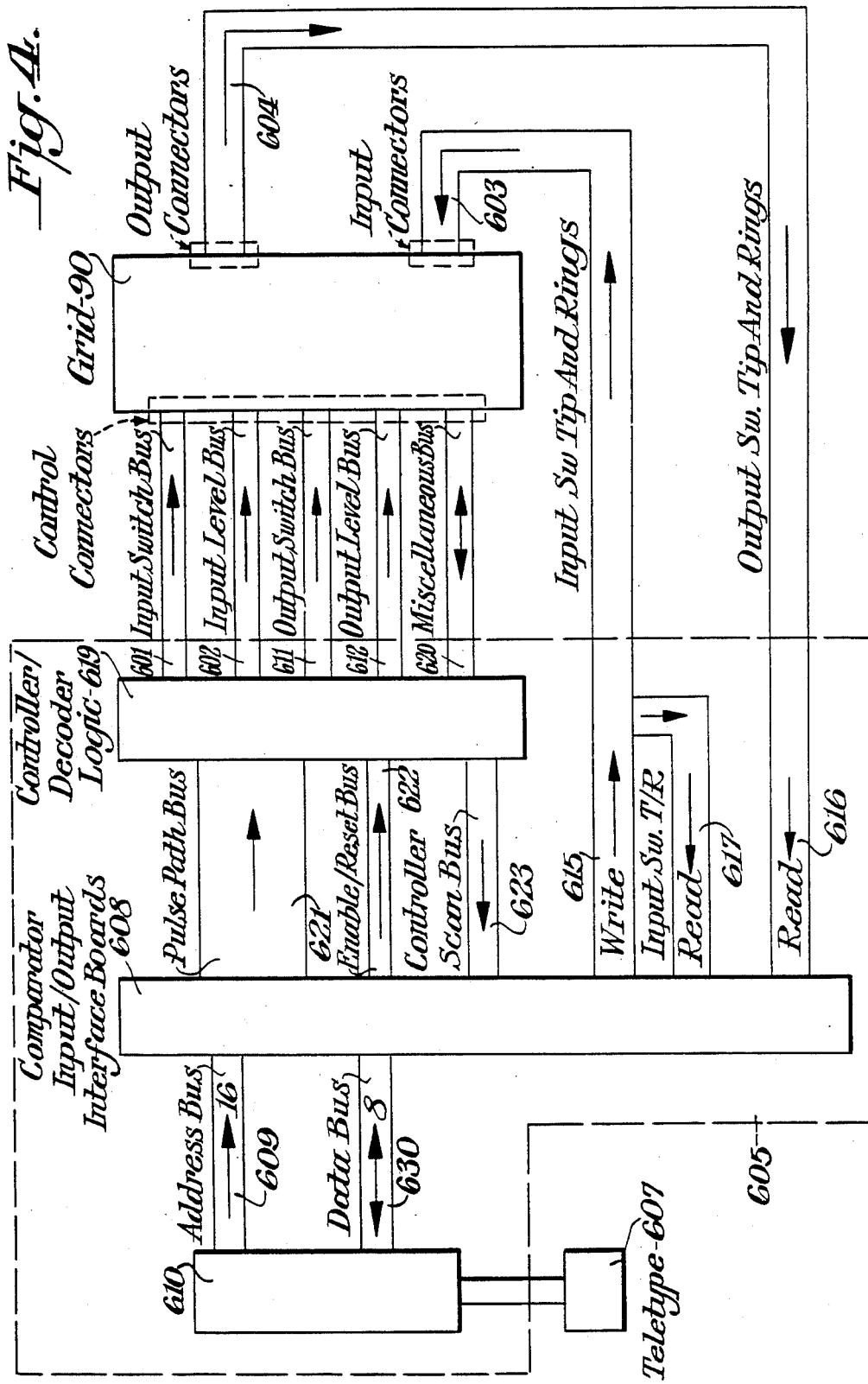
FIG. 4 is a circuit diagram of a testing circuit of the present invention.

A small computerized test set is preferably connected and programmed to automatically or semi-automatically direct all testing operations. It is then only necessary to plug a set of test connectors into a grid to be tested, and then operate the computer by means of a teletypewriter for example. One arrangement of this type is diagrammatically shown in FIG. 4. Here a computer test assembly 605 is connected to grid 90 through switch-actuating bus connectors 601, 602, 611 and 612, miscellaneous bus 620, and line input and output connectors 603, 604. A teletypewriter 607 is also connected to a microprocessor-memory-and-teletype-interface 610 of the computer assembly. An 8K byte ROM and a 1K RAM are the only memory units needed, with a microprocessor type 6502.

A 16-bit address bus 609, and an 8-bit data bus 630, connect the microprocessor interface 610 with a network 608 of comparator, input, output and test interface boards. A controller decoder assembly 619 that includes the pulse generation and delivery, as well as enabling and reading circuits of FIG. 2 is also connected for operation by network 608, through a pulse path bus 621, an enable/reset bus 622, and a scan bus 623.

Network 608 further connects through a write bus 615 to the input tip-rings of grid 90, and through a read bus 616 to the output tip-rings of the grid. An extra feedback read bus 617 returns to a read circuit of network 608 a verification of the write signals transmitted by bus 615.

Figure 5B:
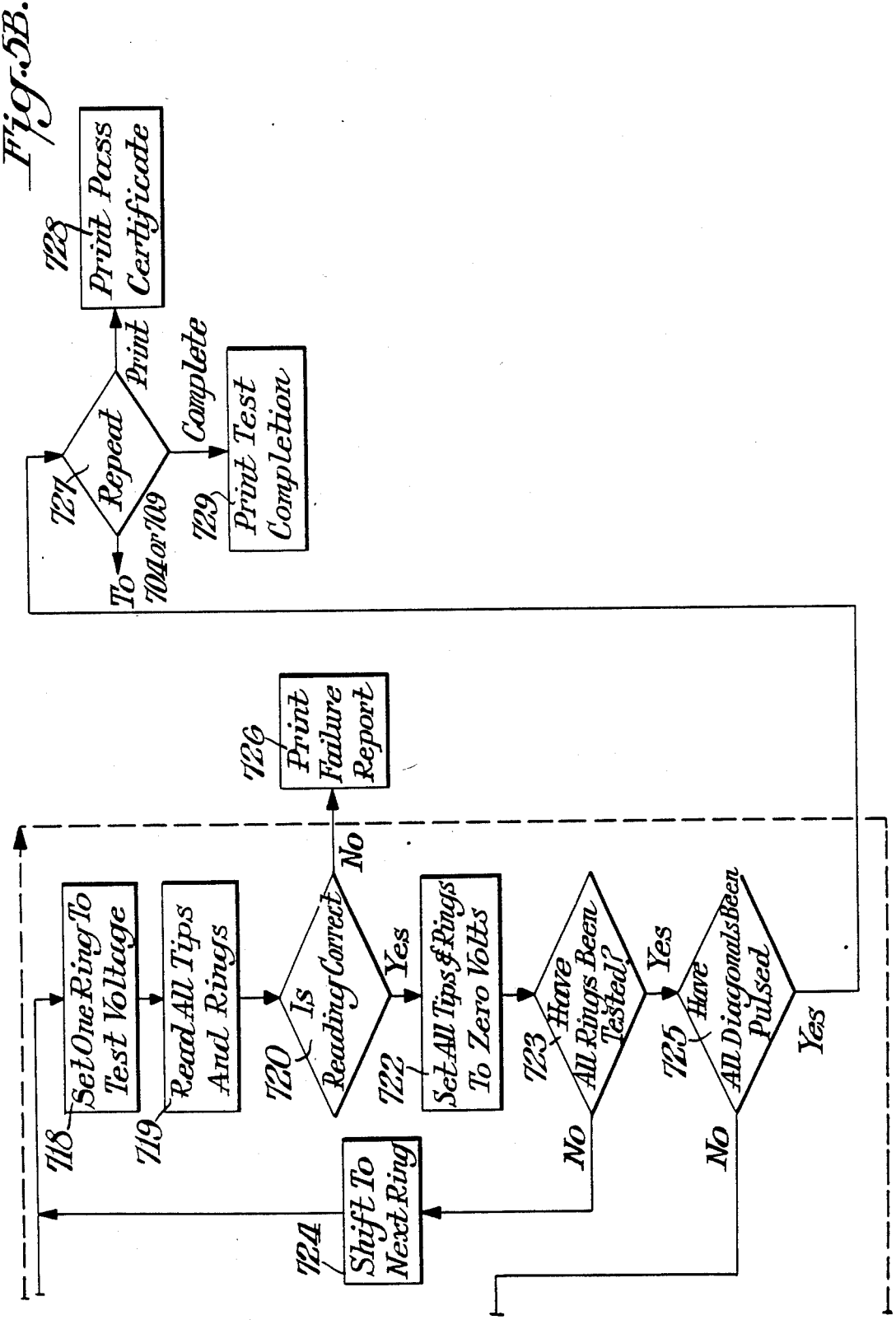
FIG. 5 (which is divided into two portions—5A and 5B) illustrates a test sequencing technique of the present invention.

A very suitable program for operating the computer is diagrammatically illustrated in FIG. 5. An entire test sequence 700 is there shown, starting with blocks 701 and 702. Block 701 is a teletype instruction selecting either the entire test sequence or an abbreviated portion of that sequence. Block 702 is a teletype entry identifying the type of grid 90 being tested. Some grids have extra monitoring circuits that can be tested and some do not.

The next step in the sequence is block 703 which is a direction to start the automatic testing, with or without special instructions to automatically stop the automatic sequence when the testing shows a grid defect. The automatic sequence begins with block 704. Here a switch pulsing up is effected to actuate a pair of switches 300 in the grid input and output lines and thus establish a grid transmission circuit.

Leads 627 and 629 of FIG. 2 convey to a memory, signals corresponding to each switch-actuating pulse if the switch circuits in the grid are not defective, and when the pulsing up of one path is completed, the sequencing moves to block 705. Here the memory is scanned, and if there is a defect shown by the absence of the appropriate signal or the presence of a defect signal, the sequence moves to block 706 where the teletype is actuated to print to the defect. If there is no defect, the sequence moves to block 707. Depending upon the instruction entered in block 703, the sequence will automatically stop after block 706, or will automatically continue to block 707 after the teletyping of the defect.

Block 707 is arranged to cause a predetermined number of paths to be sequentially pulsed up. After the counting of the completion of the first path, the sequence is shifted to block 708 which selects the next path and then returns to block 704 for the next switch pulsing. Each pulsing up of a switch path can be arranged to pulse down previously pulsed-up paths, either with the same pulse or with a separate down pulse. The paths are thus pulsed and tested one after another until in block 707 the total number of completions is counted. When this happens the sequence shifts to block 709.

At block 709 a set of grid circuits is pulsed up. The grid of FIG. 1 contains 64 connector links 91, and thus 64 paths can be pulsed up one at a time. Such a collection of 64 paths is called a diagonal.

After an entire diagonal is pulsed up at block 709, the sequence shifts to block 710 where all tip and ring conductors in that diagonal are grounded and the sequence then shifted to block 711. Here one of the tip conductors is switched from ground to the test voltage and the sequence shifted on to block 712. At this stage all the tip and ring voltages of the diagonal are written into a memory, after which the sequence is then shifted to block 713. Now the memory is read, and if there is a defect the sequence moves to block 714 to cause a print-out of the defect. If the test sequence does not require automatic stopping because of the defect, or if there is no defect in block 713 stage, the sequence moves to block 715 where the test voltage of block 711 is removed and all tips and rings restored to ground. This is followed by block 716 where the number of tip switchings to test voltage (at 711) is counted. An insufficient count switches the sequence to block 717 where another tip conductor of the diagonal is selected and the sequence recycled to block 711.

For one complete diagonal, 64 input tips and 64 output tips are tested by recycling, after which block 716 shifts to block 718 and its related blocks 719, 720, 721, 722, 723 and 724, which duplicate for the ring conductors of the diagonal, the tip testing of blocks 711, 712, 713, 714, 715, 716 and 717.

Grid 90 has 512 input switches and 512 output switches, so that seven additional 64-set diagonals need to be tested to complete the testing of all those switches. Accordingly after the testing of all rings on a diagonal, the sequence moves to block 725 which counts the number of diagonals tested, and shifts to block 726 if the number is not large enough, or to block 727 if it is. At block 726 the next diagonal is selected and the sequence then recycled to block 709.

Block 727 is set by the instructions received at blocks 701 and 702, to shift to block 728 and print out the completion of a test sequence. If the total number of defects is within tolerance, the print-out can further state that the grid passed that test sequence.

Block 727 can also be set by the instructions at blocks 701 or 702, to repeat the entire test sequence a predetermined number of times by shifting back to block 704 or 709. Because of possible intermittently acting grid defects it is generally desirable to run the entire sequence at least five times. If the grid passes five test sequences, the block 727 shifts the sequence to block 729 where the teletype prints out the completion of the test and terminates the sequence.

As noted, recycling from block 727 can shift directly to block 709, inasmuch as it is not too important to repeat the switch pulsing tests of blocks 704, 705, 706, 707 and 708. Indeed such switch pulsing test can be incorporated into rather than precede the tip-ring testing sequence, if it is desired to shorten the testing sequence. Thus the sequence can shift from block 703 directly to block 709, and have block 709 effect the detection and print-out of the switch pulsing currents.

The sequential pulsing up and down of the grid switches takes time so that it is thus much speedier to first pulse up the maximum number of switches and then test all the circuits so pulsed up before proceeding to the remaining circuits. Some grids or similar circuit assemblies can have their input connectors and output connectors unequal in number. Thus a subscriber-to-centraloffice grid can have very few if its subscribers telephoning at any one time. In such a situation a grid with 64 input connectors need only have 32, or even 16 output connectors to handle all calls to or from 64 subscribers. A test diagonal for such modified grids can then have a number of circuits corresponding to the total number of output or of input circuits, whichever is smaller. Some of the diagonals can test output switches previously tested in a different diagonal, for example, but paired with a new set of input switches, in order to test all the switches.

For long-distance-to-local grids the incoming leads can be smaller in number than the outgoing leads.

The computer, microprocessors, switching generators, teletypewriter and all interconnectors and plug connectors for the grid, are preferably mounted on a small wheeled cart so that the assembly can be wheeled to the location where the testing is done. For use in telephone exchanges where grids are mounted in rows of racks, the entire cart assembly is preferably made sufficiently narrow, e.g. not over 30 inches wide, to be wheeled between the rows of racks, connected to the individual grids on the racks, and operated to test one grid at a time without removing the grids from the racks.

A long, or reeled power cord can be provided to plug into the usual 110 volts AC wall source as the test assembly is wheeled between long rows of racks. Alternatively the test assembly can be fitted with a storage battery that supplies the power requirements.

For shipping the testing assembly, a closely fitting heavily padded crate can be provided so that the cart can be wheeled into it. One side of the cart can be a padded hinged door that is opened to allow the crate to be received, then closed and locked. A screw-type door fastener can be arranged to securely tighten the door and also press its padding against the test assembly. A padlock and/or wire seal on the door can be provided to discourage tampering and also show whether tampering has taken place.

A Synertek Systems Corporation computer SYM Model 1 has been found well suited for all the above operations, particularly when fitted with a Teletype Corporation Model 43 teletypewriter. The standard switching generators used by the telephone companies can be connected to, or actually incorporated in, the test assembly, but any other suitable source of controllably pulsed currents is adequate. Some grid switches require an actuating current as high as 6 amperes, but generally with a duration of not more than a few microseconds. Because telephone components can be easily damaged by even relatively low voltages on the wrong conductors, switching generators and indeed anything connected to the grid leads, should be very carefully constructed and tested before being incorporated in a circuit testing assembly. These, and the microprocessors particularly, should be checked by test operating them at well above their normal B+ potential.

Some telephone grids contain circuits in addition to those described above. For example, they can contain monitoring leads switched on and off by telephone personnel to check on the use of a telephone line. These extra leads and extra switches can also be tested in the same or a separate sequence of testing steps.

Even as so extended a complete grid testing sequence can be comfortably completed in three to six minutes, including the unplugging of the telephone company plugs from the grid and the plugging in of the test assembly plugs. Such timing still allows a dozen or more microseconds pause between successive test steps, and reducing such pauses can speed the automatic sequence to reduce its total time to as little as 1½ minutes. There is accordingly no serious disadvantage in repeating test sequences as many times as desired to check and recheck defects.

The writing in the memories of the result produced when testing each circuit, enables the computer to print out such result after each test sequence or subsequence, or upon demand, or after the sequence is completed, or even to interrupt the testing in response to a bad test result. This helps pin-point the trouble with a grid and so makes it much easier for a defective grid to be repaired.

The test assembly itself can develop faults, and it is accordingly helpful to check that assembly before it is connected to a circuit being tested. This can be done by using the assembly to test a grid that is known to be defective and has been removed from service.

In addition, diagnostic boards can be provided for checking on the switch pulsing and/or the tip-ring circuits. Thus a diagnostic board can have 64 pairs of leads securely but separately connected between 64 pairs of input terminals and 64 pairs of output terminals, and the test buses 603, 604 connected to them. Running a special test sequence beginning with block 710 should then show no tip-ring defects. Another diagnostic board can have 30-ohm resistors separately connected between 64 pairs of inputs and 64 pairs of outputs, and the test buses plugged into such a diagnostic board should show every circuit to be defective.

A diagnostic board having 64 circuits duplicating the switch circuits of a grid, can be used to check on the switch pulse testing of a testing apparatus. Such a checking sequence can terminate at block 707 with buses 501, 502, 503, and 504 plugged into the diagnostic board. A diagnostic panel can be provided with pushbutton switches controlling the separate steps of the testing sequence. A distinctive set of panel lights can be connected so that a different one is automatically lit as each of the successive steps is completed. A diagnostic sequence can then be conducted by manually actuating the push-button for the first step, then when the panel light for the completion of that step becomes lit, manually actuating the push-button for the next step, and so forth.

It is helpful then to have a separate automatic diagnostic test which first lights the panel lights in their proper sequence, and then goes through an automatic testing sequence with one of the diagnostic boards referred to, after which it automatically actuates the teletypewriter to print out all its characters in order. Repeating this automatic sequence with the second diagnostic board substituted for the first will show whether the test equipment is in proper working order.

Figure 6:
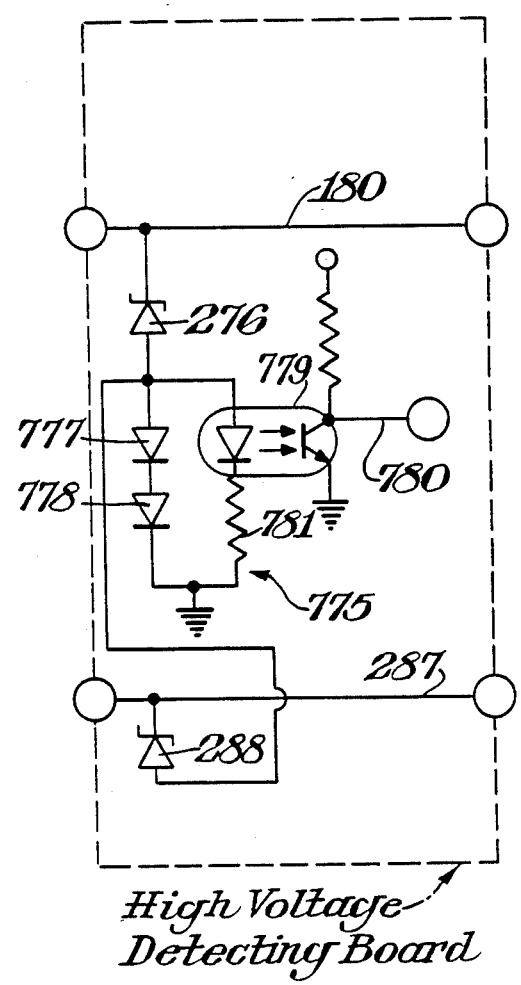
FIG. 6 shows a modified test connection arrangement in accordance with the present invention.

FIG. 6 shows a modified embodiment of a high voltage detecting circuit 775 that can take the place of circuit 275 in FIG. 3. Circuit 775 has two series-connected series-polarized diodes 777, 778 as the detector load in place of the single diode 277, and amplification in circuit 775 is effected by an optically coupled isolator 779 with a bias resistor 781. The output 780 of circuit 775 is accordingly electrically isolated from the detector portion of circuit 775 as well as from the grid being tested and the grid-testing circuits and signals. Such an output circuit is less likely to be damaged by over-voltages so that such a detector circuit is more dependable.

The foregoing testing with grounded inputs is very simply conducted by merely sequentially switching the individual buffers 182 on momentarily. Although it is not necessary, in some circuit assemblies one can repeat the testing sequence with the outputs 172, 173 directly grounded and the inputs returned to ground through a load like resistor 189. Such a modification may be particularly useful for testing circuit assemblies that are not telephone grids.

FIGS. 7 and 8 illustrate a telephone line grid that can be very effectively tested in accordance with the present invention. Such a line grid which is shown in essentially block form at 800 has in addition to input connectors 801 and switchable connections to output connectors, as in FIG. 1, different types of connections to the individual telephone subscribers.

In FIG. 7 the subscriber's connection is said to be a "loop start" connection. This is shown in the subscriber's equipment 803 where the act of lifting the telephone receiver causes the closing of switch 804 between the tip conductor 805 and the ring conductor 806. These conductors run to one of the inputs 801 of the line grid, and also to a pair of windings 811, 812 on a magnetically saturable core 807. A set of switches 808 and another set of switches 809 enable the restricting of the subscriber's connection to the core windings only, as for example when the subscriber's equipment is not in use.

Core 807 also carries an interrogate winding 813 and a read-out winding 814, which control the operation of switches 808 and 809. When the subscriber's equipment switch 804 is closed, it completes a circuit from a minus 48 volt source 816 through winding 812, ring conductor 806, switch 804, tip conductor 805, winding 811 and thence to the ground terminal 817. Windings 811 and 812 are in series-aiding relation and the closing of the foregoing circuit causes sufficient current to flow to magnetically saturate the core.

The interrogate circuit is pulsed periodically by the telephone central equipment, and when switch 804 is open each interrogating pulse produces a read-out pulse—thus showing that the subscriber's equipment 803 is not in use. When that equipment is in use switch 804 is closed and core 807 is saturated, so that an interrogation pulse produces no read-out pulse, and this triggers the switching of a dial tone and the connection of a grid input to the subscriber's conductors 805, 806.

FIG. 8 shows a "ground start" subscriber connection. Here the tip conductor 825 may be used as a coin box control or for other purposes, and only ring conductor 826 runs to a telephone receiver switch 824. That switch grounds the ring conductor when the receiver is lifted, and at its grid end that conductor has minus 48 volts applied by the setting of a group of connection straps 827, 828 and 829 from the position shown in FIG. 7 to the position shown in FIG. 8. A core-saturating current is thus caused to flow through the windings 811, 812 so that periodic interrogation and read-out correspond to those in the construction of FIG. 7.

FIG. 9 illustrates a circuit 830 for automatically determining whether a start line in a grid is a loop start or a ground start line. Here a conductor 832 is connected to the tip input connection of the grid, and through resistor 833, two optical couplers 834 and 835, another resistor 837, and a third optical coupler 838, all in series, then returns to ground at 840. A ring conductor 841 connects to conductor 832 between optical coupler 835 and resistor 837.

Coupler 834 has a light-emitting diode input 843 and a light-activated transistor output lead 844, the output being connected in series in conductor 832. Input diode 843 of coupler 834 is connected by line 842 for actuation by a microprocessor 831 through a buffer 845 such as a type 7406 buffer, which when actuated causes the effective grounding of conductor 844 and one terminal of the input diode. The other terminal of diode 843 has an operating voltage applied through resistor 846, so that when buffer 845 is actuated to cause the above-noted grounding, current flows through diode 843 and the diode generates light. This light in turn energizes transistor 844 and causes its emitter-collector resistance to fall so that current will flow from tip conductor 832 through couplers 834, 835 to ring conductor 841. Such flow actuates the diode of coupler 835 to generate light that energizes the transistor of coupler 835 to a low emitter-collector resistance. Before such energizing the transistor's collector lead 848 carries a positive potential applied through the collector's resistor 849, and the energizing causes the collector's voltage to drop, thus signalling that the grid start circuit being tested is a loop start circuit.

The foregoing voltage drop can be produced when the emitter of the 835 transistor is directly returned to ground, but that voltage dropping can be increased in intensity by biasing that emitter slightly negative. In the illustration the emitter is connected through resistor 851 to a negative potential which is returned to ground 852 through a diode 853. Only about 1 volt or less of negative bias is sufficient to provide a very strong voltage drop signal at 848 from a collector potential of plus five volts. All the potential sources are returned to ground.

The presence or absence of an output signal at 848 is recorded in a memory when conductor 842 is grounded, the dropping of the 848 voltage indicates that the diode of coupler 835 is carrying current and generating light, and this only happens when the grid start circuit is a loop start circuit. When it is a ground start circuit no current will flow through conductor 832.

The microprocessor is preferably connected to selectively momentarily ground 842, or momentarily ground conductor 854 for the third optical coupler 838, which coupler is connected to microprocessor 831 in the same way coupler 834 is. Grounding 854 causes the transistor of coupler 838 to become conductive so that in a ground start circuit current flows from the grid through ring conductor 841, resistor 837 and coupler 838, to ground at 840. This current goes through both windings 811 and 812. A loop start circuit will also cause current to flow from ring conductor 841 to ground at 840, but this current will go through winding 812 and not through winding 811, so that it will not saturate core 807.

Figure 10:
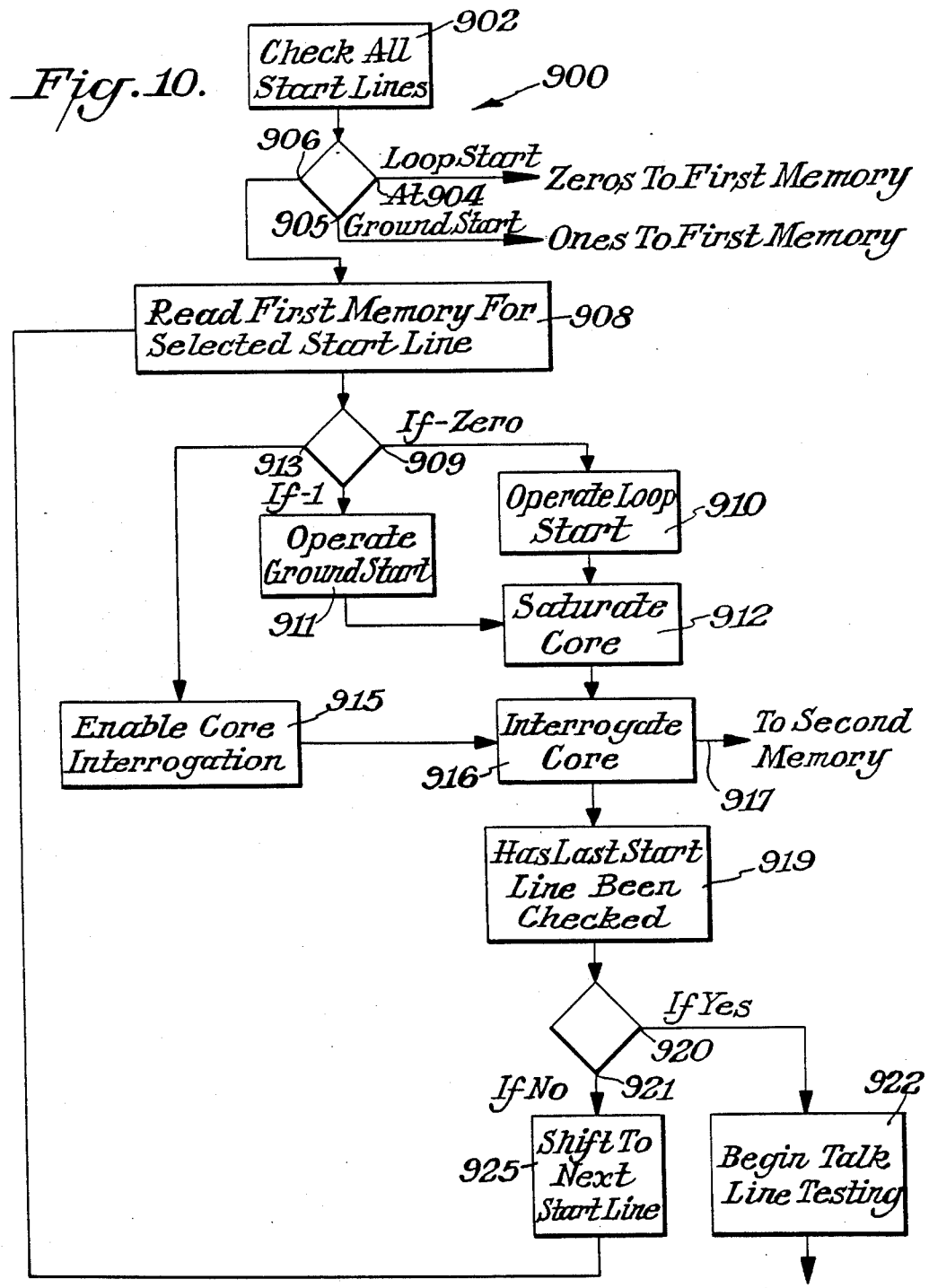
FIG. 10 is a flow diagram for a computer program suitable for testing telephone line grids pursuant to the present invention.

FIG. 10 is a flow chart that illustrates a testing program 900 for line grids as in FIGS. 7 and 8. This program is initiated after the test circuit of FIG. 9 and input and output talk circuit test connectors are all plugged into the line grid. It is preferred that the FIG. 9 test circuit be duplicated many times so that a group of 32 such circuits can be simultaneously connected to a line grid having 32 inputs, and 64 such circuits to a line grid having 64 inputs. Such line grids usually have only about 16 outputs inasmuch as it only takes about 16 telephone central lines to handle the traffic from 32 or 64 subscribers.

The line grid testing is initiated by actuating the checking shown in block 902 of all the grid start lines. This is accomplished with the circuits of FIG. 9, all of which have their couplers 834 switched to low output resistance by simultaneous or sequential pulses from microprocessor 831. In every loop start input the loop start detector 835 will accordingly show current flow and this will generate a low signal or zero that is transmitted at 904 to a first memory through lead 848. For each grid start input the memory will only record a high signal or one, from 905.

The foregoing is followed by step 906 which at 908 actuates the reading of the grid start memory for a selected start line, usually the first one of the grid. If at the next step 909 the reading is a zero for that start line, the microprocessor 831 is actuated at 910 to switch its coupler 834 to a low resistance output thus generating loop start current that at step 912 saturates core 807 for the selected start circuit. The next step is at 911 where if the memory shows a one, or ground start, for that start line, the microprocessor is actuated to switch the appropriate ground start coupler 838 to low resistance. This causes the flow, also at step 912, of core-actuating current in the ground start input.

At the next step 913 the core interrogation is enabled as shown in block 915, and at step 916 an interrogation pulse is sent through its interrogation winding 813. The resulting readout is sent at 917 to a second memory for storage. If the start input being tested is operated properly the readout will be low or zero, showing that the core is indeed saturated. A high or one readout shows that the start circuit is defective.

At step 919 the memory is read to determine whether the last start line has been checked. If at 920 it is determined that the last line has been checked, the next step becomes 922 at which point the talk line circuit testing for the grid is initiated as at 703 in FIG. 5A. If the 919 check shows at 921 that the last start line has not been checked, then the next step at 925 pulses a recycle to step 908 and shifts the reading of the first memory to the next start input circuit. This repeats the 908 through 919 sequence for that next start input circuit, and the sequence is repeatedly recycled stepwise through the start input circuits until the last one has been checked.

One entire cycle from step 908 through step 921 can take as little as 0.1 second or even less, using an interrogating pulse of about 350 milliamperes only about 4 microseconds long. The core-saturating current pulses can be several times as long and of somewhat smaller intensity. The entire testing of a 64 input line grid is readily completed entirely automatically in about 2 minutes, not counting the time for plugging in all the test connectors. As pointed out above, the complete test of all the line grid circuits is accordingly preferred to be automatically repeated four more times in order to better locate and identify intermittent defects.

It is a feature of the testing of FIGS. 9 and 10 that a telephone line grid is tested without any preparatory treatment of the grid. Normally some subscriber lines are loop start and others ground start and this distribution is purely random for any one line grid. Thus when a grid is received for testing, straps 827, 828 and 829 will be in the loop start positions for some inputs, and in the ground start positions for other inputs, and none of the straps have to be changed or even touched before the testing of the present invention. By conducting the testing in this way with a random assortment of start inputs, there is no time or labor required to see that all inputs are of the same type, and the testing is more effective in that it will detect faults in the strap connections where those faults could be masked by a preliminary strap change.

The testing sequence of FIG. 10 can be varied as by checking the successive start circuits one by one first to determine the type of start circuit and then for its interrogation response, but this causes the entire grid testing sequence to take a little more time.

Another variation is the modification of the testing circuit of FIG. 9 by adding another detector like 835 between resistor 837 and ground start coupler 838 or between that ground start coupler and ground 840. The added detector could then show the passage of ground start current between conductor 841 and ground, and thus positively record a start circuit as a ground start. This variation would reduce the chance for errors that could arise if detector 835 mis-operates and fails to detect a loop start circuit. Such failure would cause the unmodified test circuit of FIG. 9 to incorrectly record a loop start circuit as a ground start circuit.

Such a detector defect could occur in any of the 32 or 64 start input circuits of the automatic tester, or even in the internal grid reading circuitry of the line grid such as might be caused when a connector plug is mishandled and doesn't properly connect all its leads. This will generally become self-evident when tests of successive grids show the same failure indication. The addition of another detector to the start detector set has been found unnecessary, inasmuch as it is very seldom that successive grids show the same failure.

Telephone switching grids generally have a number of diodes hand-wired in place to help direct the flow of current, as for example, in selecting and operating the proper switches. Inasmuch as those diodes are subject to possible failures as by shorting or open-circuiting, the testing of the present invention can also include the checking of the diodes. Indeed, the diode checking preferably precedes the testing of the grid-switching action.

The diodes to be tested have one of their two terminals directly wired to a grid connection plug or jack on the grid. In many cases the second terminals of the diodes are internally wired and not readily accessible for the application of test leads. However, such half-accessible diodes have their internal terminals connected together through the various grid switches so that the diodes are poled in parallel. These diodes are readily tested as by applying a dc voltage between the accessible terminals of two of the diodes, measuring the dc current that then flows through the resulting circuit, and then reversing the dc voltage and again measuring the resulting current. By having the dc voltage at about the peak inverse voltage characteristics of the diodes, or of the diode with the smaller peak inverse voltage, the currents produced with each dc pularity should be extremely small. A significant current at one dc polarity shows that one diode is defective, and a significant current at the opposite dc polarity shows that the other diode is defective. In each case the defective diode is the one which is supposed to block the applied polarity.

It is possible that by reason of a defective grid switch or group of grid switches, an internal diode-to-diode interconnection can be inoperative and thus appear to indicate both diodes that should have had such interconnection are good even if one or both are defective. Inasmuch as many of these parallel-connected grid diodes are parallel connected in multiple, the diode testing can be accomplished by simultaneously connecting one terminal of the dc testing polarity to a group of two or more of those accessible multiple diode terminals while connecting the other dc test terminal to the accessible terminal or terminals of one or more of the remainder of the multiple diodes. Such group testing will help show up diode defects. Where grid diodes are not internally parallelled, externally available plug or jack pins are provided so that these diodes can be directly tested by a reversely poled dc voltage.

Telephone switching grids can also contain transistors or SCR's. These are provided with externally accessible terminals and can be simply tested as though each is a pair of diodes. They can alternatively be tested for gain or transconductance.

Obviously many modifications and variations of the present invention are possible in the light of the above teachings. It is, therefore, to be understood that within the scope of the appended claims the invention may be practiced otherwise than as specifically described.

We claim:

1. In the testing of a telephone switching grid, the improvement according to which a microprocessor-controlled set of testing steps are conducted in rapid sequence and the result of each testing step is recorded in rapid sequence, the total time thus spanned being between about 1½ and about 6 minutes, and the sequence is then repeated several times so that a total of at least five testing sequences are conducted, to thus detect intermittent defects in the grid.

2. The combination of claim 1 in which the microprocessor is connected to automatically repeat the testing sequences the total number of times.

* * * * *